United States Patent [19]
Lasinski

[11] Patent Number: 5,139,285
[45] Date of Patent: Aug. 18, 1992

[54] SNAP-ON QUARTER PANEL WHEEL OPENING SKIRT

[75] Inventor: Jerome S. Lasinski, Waterford, Mich.

[73] Assignee: General Motors Corporation, Detroit, Mich.

[21] Appl. No.: 709,458

[22] Filed: Jun. 3, 1991

[51] Int. Cl.$^5$ .............................................. B62D 25/16
[52] U.S. Cl. ................................ 280/849; 292/DIG. 1
[58] Field of Search ................... 49/394; 292/341.17, 292/DIG. 1, DIG. 11; 280/848, 849, 847, 154

[56] References Cited

U.S. PATENT DOCUMENTS

| | | | |
|---|---|---|---|
| 2,062,597 | 12/1936 | Moore | 292/110 |
| 2,081,231 | 5/1937 | Grimshaw | 280/153 |
| 2,124,790 | 7/1938 | Lyon | 280/848 |
| 2,196,030 | 4/1940 | Schatzman | 280/153 |
| 2,277,488 | 3/1942 | Haltenberger | 280/153 |
| 2,368,231 | 1/1945 | Lyon | 280/153 |
| 2,474,852 | 7/1949 | Lyon | 280/153 |
| 2,606,773 | 8/1952 | Schatzman | 280/153 |
| 2,611,628 | 9/1952 | Schatzman | 280/848 |
| 2,620,204 | 12/1952 | Hammond | 280/848 |
| 2,689,749 | 9/1954 | Wise | 280/153 |
| 2,832,609 | 4/1958 | Buckenhizer | 280/153 |
| 2,966,367 | 12/1960 | Schatzman | 280/153 |
| 3,384,388 | 5/1968 | Kobrehel et al. | 280/153 |
| 3,584,898 | 6/1971 | Pearson et al. | 280/153 R |
| 4,062,580 | 12/1977 | West | 293/62 |

Primary Examiner—Andres Kashnikow
Assistant Examiner—Michael Mar
Attorney, Agent, or Firm—Raymond I. Bruttomesso, Jr.

[57] ABSTRACT

An assembly for mounting a wheel opening skirt in a wheel access opening of a body panel of a motor vehicle. The skirt has a forward tab, a rear tab and a pair of center tabs. A bracket for the forward tab and each of the center tabs is permanently secured to the body panel. Each bracket has a slot for receiving the aligned tab retaining and positioning the skirt in an inboard-outboard position relative to the body panel. A ramp latch has a ramp surface with a slot for receiving the rear tab of the skirt to retain the skirt to the body panel. The ramp latch is pivotally mounted to the body panel for movement between an engaged position with the rear tab engagable by the slot and a released position with the rear tab disengaged from the slot. A spring engages the latch for biasing the latch to the engaged position. In operation, the skirt is inserted in the wheel access opening by inserting the forward tab into the respective slot and rotating the skirt upward until the forward tab and the center tabs are received by the respected slots. Simultaneously, the rear tab engages the ramp surface urging the ramp latch to the released position enabling the rear tab to register with the slot of the latch. The spring urges the latch into the engaged position where the slot engages the rear tab to thereby retain the wheel opening skirt securely to the body panel.

7 Claims, 2 Drawing Sheets

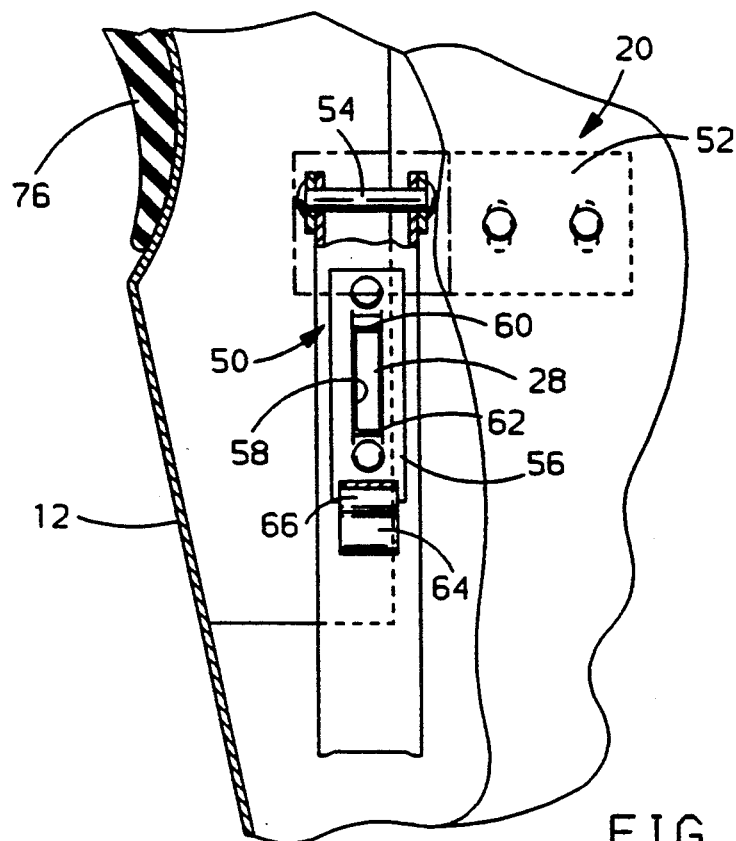
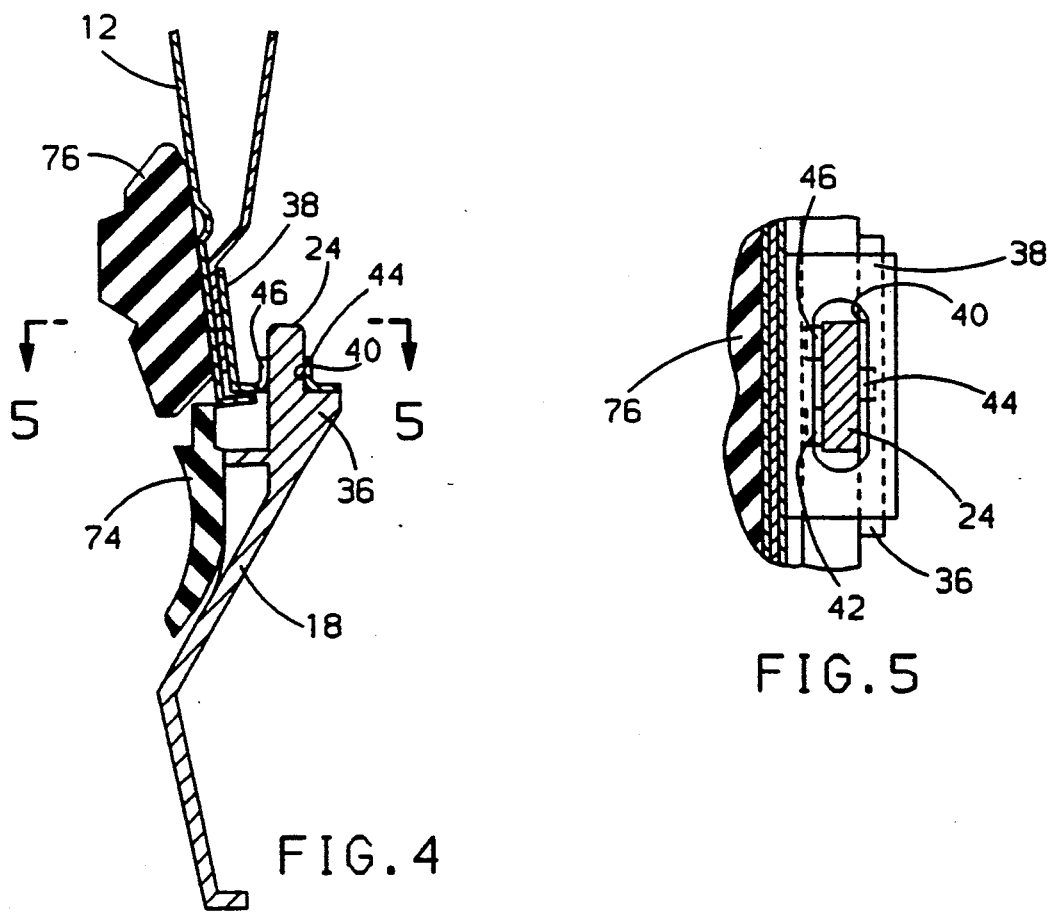

SNAP-ON QUARTER PANEL WHEEL OPENING SKIRT

This invention relates to an assembly for securing a wheel opening skirt to a body panel and more particularly to a ramp latch mounted to the body panel which pivotally engages and disengages a tab on the wheel opening skirt to retain the skirt to the body panel.

BACKGROUND OF THE INVENTION

It is known to have a removable skirt covering a portion of the wheel opening for achieving a desired styling design. It is known to mount the wheel opening skirt to the vehicle body panel with wires or latches located on the skirt and rotate the wire or latch to securely engage a slot located on the body panel. This method of mounting the wheel opening skirt requires the operator to reach under the wheel opening skirt to secure the skirt.

It is also known to have a latch mechanism mounted on the wheel opening skirt with a hole in the wheel opening skirt for insertion of a tool to rotate the latch mechanism as disclosed in U.S. Pat. No. 2,062,597. The latch mechanism and tool eliminate the need to reach under the wheel opening skirt to attach and detach the skirt from the body panel. However, the operator is still required to turn the latch to secure the skirt.

It would be desirable to have a wheel opening skirt that snaps into a secure fit position and has the minimum amount of hardware on the skirt thereby reducing the weight.

SUMMARY OF THE INVENTION

This invention provides an assembly for mounting a wheel opening skirt in a wheel access opening of a body panel of a motor vehicle. The wheel opening skirt of generally a trapezoid shape has a forward tab, a rear tab and an upper edge having a pair of center tabs. A bracket for the forward tab and each of the center tabs is permanently secured to the body panel. Each bracket has a slot for receiving the aligned tab retaining the wheel opening skirt and positioning the wheel opening skirt in an inboard-outboard position relative to the body panel. The slot for the forward tab enables pivotal movement of the wheel opening skirt about the forward tab. A ramp latch has a ramp surface for engaging the rear tab with a slot for receiving the rear tab of the wheel opening skirt to retain the wheel opening skirt to the body panel. The ramp latch is pivotally mounted to the body panel for movement between an engaged position with the rear tab engagable by the slot and a released position with the rear tab disengaged from the slot. A spring engages the latch for biasing the latch to the engaged position. In operation, the wheel opening skirt is inserted in the wheel access opening by inserting the forward tab into the respective slot and rotating the wheel opening skirt upward until the forward tab and the center tabs are received by the respected slots. Simultaneously, the rear tab engages the ramp surface urging the ramp latch to the released position enabling the rear tab to register with the slot of the latch. The spring urges the latch into the engaged position where the slot of the latch engages the rear tab to thereby retain the wheel opening skirt securely to the body panel.

The center tabs each have a locator which abuts the brackets associated with the respective tabs on the upper edge of the wheel opening skirt to position the wheel opening skirt vertically in relation to the body panel.

One object, feature and advantage resides in the provision of an assembly for mounting a wheel opening skirt having a ramp latch pivotally mounted to a body panel and having a ramp surface with a slot for receiving a rear tab of the wheel opening skirt and a spring engaging the ramp latch for biasing the ramp latch to an engaged position engaging the rear tab, whereby the wheel opening skirt is inserted in the wheel access opening by inserting a forward tab into a respective slot and the wheel opening skirt is rotated upward until the rear tab engages the ramp surface urging the ramp latch to a released position enabling the rear tab to register with the slot in the ramp latch and the spring urges the ramp latch into the engaged position where the slot of the ramp latch engages the rear tab to thereby retain the wheel opening skirt securely to the body panel.

Further objects, features and advantages of the present invention will become more apparent to those skilled in the art as the nature of the invention is better understood from the accompanying drawings and detailed description.

BRIEF DESCRIPTION OF THE DRAWINGS

FIG. 3 is a sectional view taken in the direction of arrows 3—3 in FIG. 2;

FIG. 4 is a sectional view taken in the direction of arrows 4—4 in FIG. 1;

FIG. 5 is a sectional view taken in direction of arrows 5—5 in FIG. 4.

DESCRIPTION OF THE PREFERRED EMBODIMENT

Figure 1:
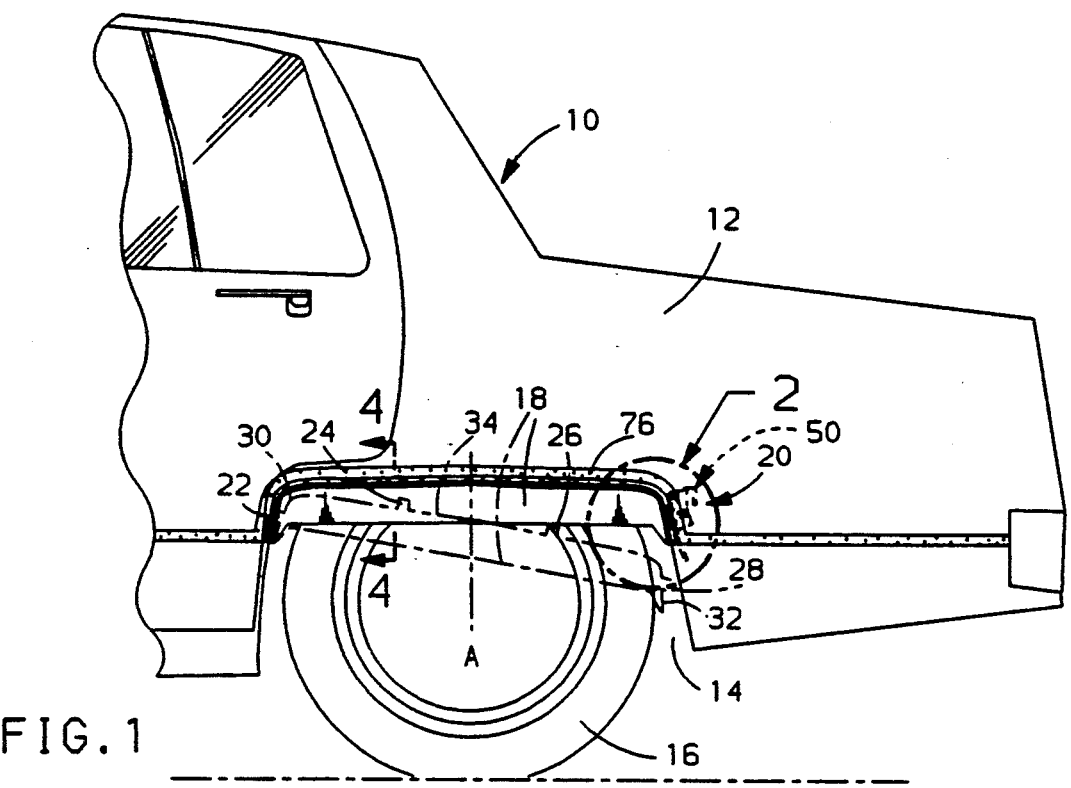
FIG. 1 is a side view of the rear quarter of a motor vehicle having a wheel open skirt. The wheel opening skirt is shown in phantom partially removed.

Referring to FIG. 1, a motor vehicle 10 has a rear quarter body panel 12 with a wheel access opening 14 to grant access to a rear wheel 16. A wheel opening skirt 18 of a generally trapezoidal shape, made of molded plastic or other suitable material, covers a portion of the wheel access opening 14 and maintains continuity of appearance there across.

The wheel opening skirt 18 is attached to the body panel 12 by an assembly 20 having several components. Referring to FIG. 1, a quadruplet of tabs 22, 24, 26 and 28 are formed as an integral part of the wheel opening skirt 18. The tabs 22, 24, 26 and 28 are symmetric about a vertical center line "A". The forward tab 22 and the rear tab 28 are on a forward and rearward edge 30 and 32 of the wheel opening skirt 18, respectively. The center tabs 24 and 26 are located on an upper edge 34 of the wheel opening skirt 18. Referring to FIG. 4, the center tab 24 has a locator 36 which is also formed as an integral part of the wheel opening skirt 18. The other center tab 26 has a similar integral locator. A molding 74 is mounted to the wheel opening skirt 18 and aligns with a body molding 76 mounted on the body panel 12 to form a continuation when the skirt 18 is attached to the body panel 12.

Referring to FIG. 4, a bracket 38 is spot welded or otherwise securely attached to the body panel 12 and aligned with the center tab 24. The bracket 38 has a slot 40 for receiving the tab 24. Referring to FIGS. 4 and 5, the bracket 38 has three integral clips 42, 44 and 46 that project upward around the slot 40 for firmly engaging the tab 24. The locator 36 on the center tab 24 abuts the bracket 38 assuring the wheel opening skirt 18 is in the proper position vertically in relation to the body panel 12. Two other brackets, not shown, align with the other center tab 26 and the forward tab 22. These other brackets are similarly mounted as the bracket 38 and likewise have a slot and integral clips for assuring the proper inboard-outboard alignment of the wheel opening skirt 18.

Figure 2:
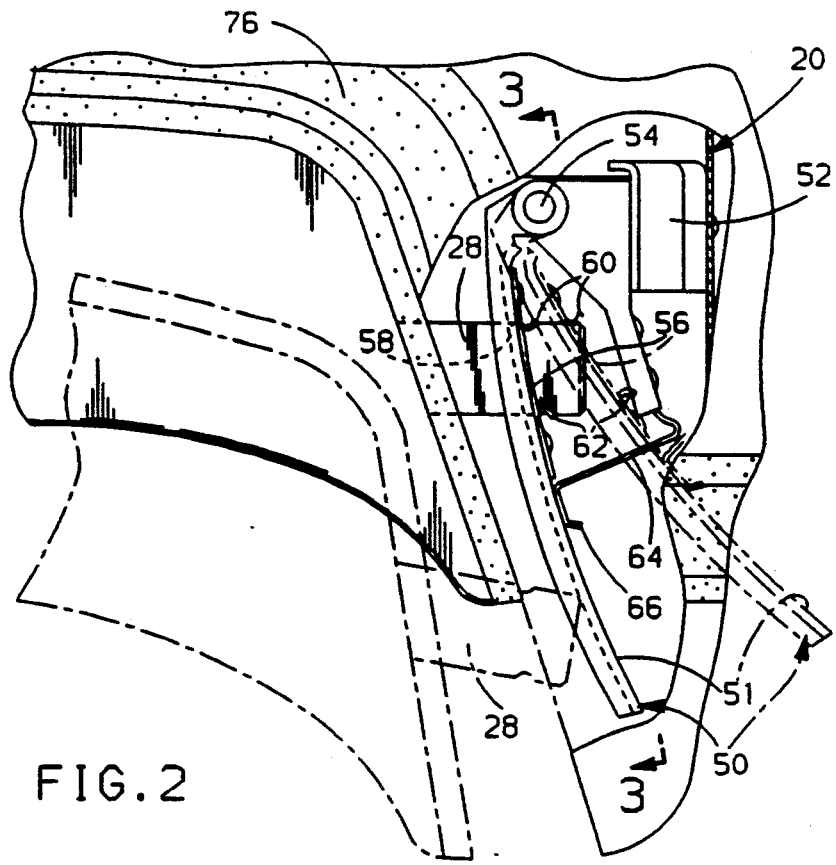
FIG. 2 is an enlargement of the encircled portion of FIG. 1. The wheel opening skirt is shown in phantom partially removed. A ramp latch in a released position is shown in phantom.

Referring to FIG. 2, a ramp latch 50 is located on the body panel 12 near the rear of the wheel access opening 14. Referring to FIGS. 2 and 3, the ramp latch 50 has a ramp surface 51 which acts as a cam and is pivotally connected by a pivot 54 to a bracket 52 mounted on the body panel 12. A plate 56 is pop-riveted to the ramp surface 51 and has a slot 58 formed with a pair of clips 60 and 62 for firmly engaging the rear tab 28. The ramp surface 51 depends generally downward to a resting position where its center of gravity underlies the pivot 54 and the ramp latch 50 is in an engaged position as shown in FIG. 2. A strip of resilient metal 64 is riveted to the bracket 52 and is bent into engagement with the ramp latch 50 and forms a spring 66 which assists in urging the ramp latch 50 into this engaged position.

To install the wheel opening skirt 18, the skirt 18 is positioned with the forward tab 22 inserted in the associated slot as shown in phantom in FIG. 1. The rear portion of the wheel opening skirt 18 is rotated upward with the center tabs 24 and 26 aligned with the respected slots. As rotation progresses, the rear tab 28 engages the ramp surface 51, as shown in phantom in FIG. 2. As the wheel opening skirt 18 continues to rotate upward, the rear tab 28 which is engaging the ramp surface 51 urges the ramp latch 50 to a release position shown in phantom in FIG. 2. When the rear tab 28 aligns with the slot 58 in the ramp surface, the spring 66 urges the ramp latch 50 into the engaged position where the tab 28 is received by the slot 58 securing the wheel opening skirt 18 to the body panel 12. At this time, referring to FIG. 4, the locator 36 on the center tab 24 abuts the bracket 38, and likewise the other locator, to assure the wheel opening skirt 18 is properly aligned vertically and the slots and the tabs 22, 24, 26 and 28 assure proper inboard-outboard alignment thereby returning the skirt 18 securely to the body panel 12.

To release the wheel opening skirt 18 in order to change the wheel 16, the ramp latch 50 is rotated back to the release position shown in phantom in FIG. 2. The ramp latch 50 can be rotated by the operator reaching under the vehicle 10 to physically rotate the latch 50 or a cable, not shown, can run from the ramp latch 50 to a handle located in a more convenient location, such as within the trunk. When the ramp latch 50 is rotated to the release position, the slot 58 disengages the rear outer tab 28 allowing the rear portion of the wheel opening skirt 18 to rotate downward under its own weight or with operator assistance.

Only the left wheel access opening 14 is shown, however, a right wheel access opening is similar in that it has a ramp lever and three brackets. The wheel opening skirt for the right side is not identical to the left side because of the curvature of the body panel of the motor vehicle and skirt.

While an embodiment of the present invention has been explained, various modifications within the spirit and scope of the following claims will be readily apparent to those skilled in the art.

The embodiments of the invention in which an exclusive property or privilege is claimed are defined as follows:

1. An assembly for mounting a wheel opening skirt in a wheel access opening of a body panel of a motor vehicle, the assembly comprising:

the wheel opening, skirt having a pair of tabs, fixedly secured thereto a first one of the pair of tabs being located on a forward edge of the wheel opening skirt and a second one of the pair of tabs being located on a rear edge of a wheel opening skirt;

the body panel having a slot for receiving one of the pair of tabs to enable pivotal movement of the wheel opening skirt about the one tab;

latch means having a slot for receiving the other of the pair of tabs said latch means being movably mounted on the body panel for movement between an engaged position with the other tab engagable by the slot and a released position with the other tab disengaged from the slot;

spring means for biasing the latch means to the engaged position; and cam means located on the latch means, the other tab and acting upon said cam means upon upward pivoting of the wheel opening skirt about the one tab to urge the latch means to the released position thereby enabling the other tab to register with the slot in the latch means, the spring means urging the latch means into the engaged position where the slot of the latch means receives the other tab to thereby retain the wheel opening skirt securely to the body panel.

2. An assembly for mounting a wheel opening skirt in a wheel access opening of a body panel of a motor vehicle, the assembly comprising:

the wheel opening skirt of generally a trapezoid shape having a forward tab, a rear tab and an upper edge having at least one tab said forward and rear tabs being fixedly secured to said wheel opening skirt;

a bracket for the forward tab and a bracket for each of the tabs on the upper edge permanently secured to the body panel and each bracket having a slot for receiving the aligned tab retaining the wheel opening skirt and positioning the wheel opening skirt in an inboard-outboard position relative to the body panel and the slot for the forward tab to enable pivotal movement of the wheel opening skirt about the forward tab;

a latch member having a surface for engaging the rear tab with a slot for receiving the rear tab of the wheel opening skirt to retain the wheel opening skirt to the body panel and the latch means pivotally mounted to the body panel for movement between an engaged position with the rear tab engagable by the slot and a released position with the rear tab disengaged from the slot; and spring means engaging the latch member for biasing the latch to the engaged position whereby the wheel opening skirt is inserted in the wheel access opening by inserting the forward tab into the respective slot and rotating the wheel opening skirt upward until the forward tab and the tabs on the upper edge are received by the respected slots and simultaneously the rear tab engages the surface urging the latch member to the released position thereby enabling the rear tab to register within the slot of the latch member, the spring means urging the latch member into the engaged position where the slot of the latch member receives the rear tab to thereby retain the wheel opening skirt securely to the body panel.

3. An assembly as in claim 2 wherein the tabs on the upper edge each have a locator and the locators abutting the brackets associated with the respective tabs on the upper edge of the wheel opening skirt to position the wheel opening skirt vertically in relation to the body panel.

4. An assembly as in claim 3 wherein the tabs and slots are symmetrically placed about a vertical center line.

5. An assembly for mounting a wheel opening skirt to a motor vehicle having a body panel and the body panel having a wheel access opening, the assembly comprising:

the wheel opening skirt having a forward tab, a rear tab and an upper edge having a pair of center tabs, the center tabs each having a locator the forward and rear tabs being fixedly secured to said wheel opening shirt;

a triplet of brackets permanently secured to the body panel and aligned with the forward tab and the center tabs respectively and each bracket having a slot for receiving the respective tab retaining the wheel opening skirt and positioning the wheel opening skirt in an inboard-outboard position relative to the body panel and the slot for the forward tab to enable pivotal movement of the wheel opening skirt about the forward tab and the locators of the center tabs abutting the respective brackets to position the wheel opening skirt vertically in relation to the body panel;

a ramp latch having a ramp surface for engaging the rear tab with a slot for receiving the rear tab of the wheel opening skirt to retain the wheel opening skirt to the body panel, the ramp latch being pivotally mounted to the body panel for movement between an engaged position with the rear tab engagable by the slot and a released position with the rear tab disengaged from the slot; and spring means engaging the ramp latch for biasing the ramp latch to the engaged position whereby the wheel opening skirt is inserted in the wheel access opening by inserting the forward tab into the respective slot and rotating the wheel opening skirt upward until the forward tab and center tabs are received by the respective slots and the locators abut the bracket and simultaneously the rear tab engages the ramp surface urging the ramp latch to the released position enabling the rear tab to register with the slot in the ramp latch, the spring means urging the ramp latch into the engaged position where the slot of the ramp latch receives the rear tab to thereby retain the wheel opening skirt securely to the body panel.

6. An assembly as in claim 5 wherein the spring means is a resilient metal strip.

7. An assembly as in claim 6 wherein the tabs and slots are symmetrically placed about the vertical center line.

* * * * *